(12) United States Patent
Reber

(10) Patent No.: US 6,287,229 B2
(45) Date of Patent: Sep. 11, 2001

(54) SHORT PITCH TOOTH CHAIN

(75) Inventor: Reinhold Friedrich Reber, Toronto (CA)

(73) Assignee: The Mesh Company, LLC, Paris, AR (US)

( * ) Notice: Subject to any disclaimer, the term of this patent is extended or adjusted under 35 U.S.C. 154(b) by 0 days.

(21) Appl. No.: 09/742,655

(22) Filed: Dec. 21, 2000

Related U.S. Application Data

(62) Division of application No. 09/247,211, filed on Feb. 9, 1999, now Pat. No. 6,186,920.
(60) Provisional application No. 60/074,252, filed on Feb. 10, 1998.

(51) Int. Cl.[7] .................................................. F16G 13/04
(52) U.S. Cl. ......................... 474/213; 474/213; 474/157; 474/214
(58) Field of Search .................................. 474/206, 212, 474/213, 214, 215, 216, 217, 152, 155, 156, 157

(56) References Cited

U.S. PATENT DOCUMENTS

| | | |
|---|---|---|
| 515,004 | 2/1894 | Loomis . |
| 587,387 | 8/1897 | Christy . |
| 1,028,893 | 6/1912 | Luther . |
| 2,158,622 | 5/1939 | Festenberg-Pakisch . |
| 2,769,346 | 11/1956 | Flocke . |
| 4,906,224 | 3/1990 | Reber . |
| 4,915,675 | 4/1990 | Avramidis . |
| 4,915,676 | 4/1990 | Komeya . |
| 5,154,674 | 10/1992 | Avramidis et al. . |
| 5,334,111 | 8/1994 | Cole, Jr. et al. . |
| 5,397,280 | 3/1995 | Skurka . |
| 5,445,570 | * 8/1995 | White ................................... 474/206 |
| 5,588,926 | * 12/1996 | Mott et al. .......................... 474/212 |
| 5,813,934 | 9/1998 | Patton . |
| 5,816,967 | * 10/1998 | Ledvina et al. ........................ 474/84 |
| 5,846,149 | * 12/1998 | Ledvina et al. ........................ 474/84 |
| 6,203,460 | * 3/2001 | Parks et al. .......................... 474/206 |

* cited by examiner

Primary Examiner—David A. Bucci
Assistant Examiner—Marcus Charles
(74) Attorney, Agent, or Firm—Fay, Sharpe, Fagan, Minnich & McKee, LLP

(57) ABSTRACT

A short pitch tooth chain that reduces the level of impact noise generated during operation is disclosed. A chain system includes a first sprocket having a plurality of sprocket teeth spaced apart by a first distance, a second sprocket also having a plurality of sprocket teeth spaced apart by the first distance, and a short pitch tooth chain wrapped around the first and second sprockets. The short pitch tooth chain includes a first link having a first aperture spaced from a second aperture by a second distance, a second link having a first toe spaced from a second toe by the first distance, the second link having a third aperture and being connected to the first link by a first pin extending through the first and third apertures, and a third link having a third toe spaced from a fourth toe by the first distance, the third link having a fourth aperture and being connected to the first link by a second pin extending through the second and fourth apertures. The first distance defines a sprocket chordal pitch and the second distance defines a chain pitch wherein the chain pitch is about twice the sprocket chordal pitch.

20 Claims, 13 Drawing Sheets

SHORT PITCH TOOTH CHAIN

CROSS REFERENCE TO RELATED APPLICATIONS

This application claims the benefit of U.S. Provisional Patent Application Serial No. 60/074,252, filed Feb. 10, 1998, and is a divisional of U.S. patent application Ser. No. 09/247,211, filed Feb. 9, 1999, now U.S. Pat. No. 6,186,920.

BACKGROUND OF THE INVENTION

The present invention relates to the chain arts, and in particular, a short pitch tooth chain that provides improved noise reduction over conventional tooth chains.

Drive chain systems and timing chain systems incorporating known chains such as inverted tooth chains and roller chains have several components of undesirable noise. A major source of noise is the sound generated as the chain engaging members, such as inverted teeth or rollers, leave the span and collide with a sprocket during meshing. The resulting impact noise is repeated with a frequency generally equal to that of the frequency of the chain meshing with the sprocket. It is known that the impact noise levels associated with chains can be reduced by altering the engagement geometry of the chain and/or sprocket to, in part, reduce the impact energy that must be absorbed during the meshing process.

The present invention contemplates a new and improved short pitch tooth chain which provides improved noise reduction over conventional inverted tooth chains.

SUMMARY OF THE INVENTION

In accordance with one aspect of the present invention, a tooth chain is disclosed. The tooth chain includes a first link having a first aperture spaced from a second aperture by a first distance; a second link having a first toe spaced from a second toe by a second distance, the second link having a third aperture and being connected to the first link by a first pin extending through the first and third apertures; a third link having a third toe spaced from a fourth toe by the second distance, the third link having a fourth aperture and being connected to the first link by a second pin extending through the second and fourth apertures; and the first distance defining a chain pitch and the second distance defining a sprocket chordal pitch wherein the chain pitch is about twice the sprocket chordal pitch.

In accordance with another aspect of the present invention, a chain system is disclosed. The chain system includes a first sprocket having a first plurality of sprocket teeth spaced apart by a first distance; a second sprocket having a second plurality of sprocket teeth spaced apart by the first distance; a chain wrapped around the first and second sprockets, the chain including a first link having a first aperture spaced from a second aperture by a second distance, a second link having a first toe spaced from a second toe by the first distance, the second link having a third aperture and being connected to the first link by a first pin extending through the first and third apertures, a third link having a third toe spaced from a fourth toe by the first distance, the third link having a fourth aperture and being connected to the first link by a second pin extending through the second and fourth apertures; and the first distance defining a sprocket chordal pitch and the second distance defining a chain pitch wherein the chain pitch is about twice the sprocket chordal pitch.

In accordance with a further aspect of the present invention, a chain is disclosed. The chain includes a first link member having a first aperture spaced from a second aperture by a first distance; a second link member connected to the first link member and having a first toe spaced from a second toe by a second distance, the toes being adapted for engagement with tooth spaces associated with a sprocket, the tooth spaces being spaced apart by a third distance; and the second distance being substantially equal to the third distance, and the second distance being about one half of the first distance.

In accordance with yet another aspect of the present invention, a chain system is disclosed. The chain system includes a first sprocket having a first plurality of tooth spaces spaced apart by a first distance; a second sprocket having a second plurality of tooth spaces spaced apart by the first distance; and a chain including a first link member having a first aperture spaced from a second aperture by a second distance, a second link member connected to the first link member and having a first toe spaced from a second toe by a third distance, the toes being adapted for engagement with the first and second plurality of tooth spaces, and the first distance being substantially equal to the third distance, and the third distance being about one half of the second distance.

In accordance with a still further aspect of the present invention, a link member for a chain is disclosed. The link member includes a body portion defining a first toe and a second toe spaced from the first toe by a predetermined distance, the toes adapted for meshing engagement with tooth spaces associated with a sprocket, and the link member further comprising a single aperture extending through the body portion.

One advantage of the present invention is the provision of a short pitch tooth chain which reduces noise levels by increasing the frequency at which the chain meshes with a sprocket to a level which is inaudible, or at least less audible to the human ear.

Another advantage of the present invention is the provision of a short pitch tooth chain having a chain pitch value which is approximately twice a sprocket chordal pitch value.

A further advantage of the present invention is the provision of a chain system having a short pitch tooth chain that reduces noise levels by increasing the frequency at which the chain meshes with a sprocket to a level which is inaudible, or at least less audible to the human ear.

Yet another advantage of the present invention is the provision of chain system having a short pitch tooth chain with a chain pitch value which is approximately twice a sprocket chordal pitch value.

Still further objects and advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

DETAILED DESCRIPTION OF THE PREFERRED EMBODIMENT(s)

Figure 1:
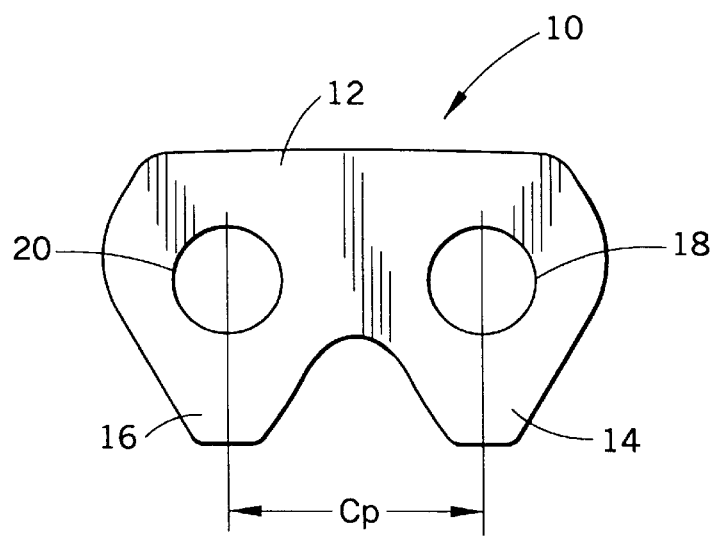
FIG. 1 illustrates a conventional double-toed link for a known inverted tooth chain.
Figure 2:
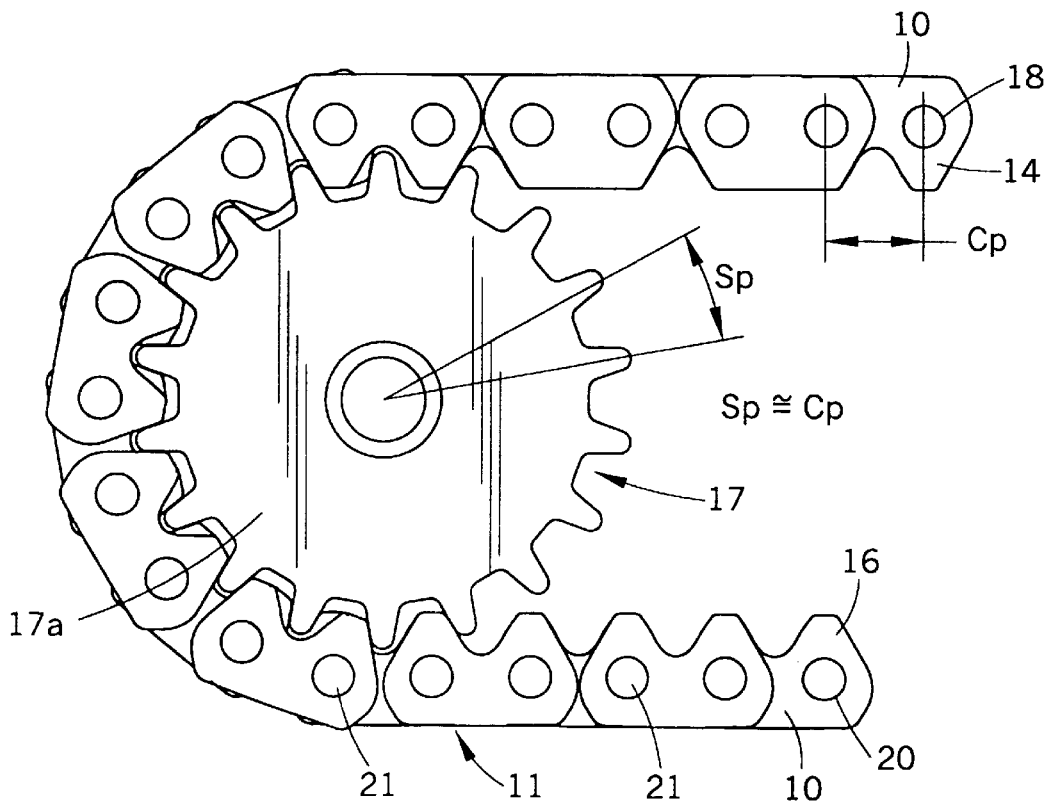
FIG. 2 is a fragmentary view of a conventional inverted tooth chain that incorporates double-toed links of FIG. 1, as the chain engages a conventional sprocket.

With reference to FIGS. 1 and 2, a conventional double-toed link 10 for a known inverted tooth chain 11 includes a body portion 12 having a first toe 14 spaced from a second toe 16. The toes 14, 16 consecutively engage adjacent and mutually conforming tooth spaces 17 associated with a sprocket 17a. The link 10 also includes a first aperture 18 and a second aperture 20 spaced apart from the first aperture. The apertures 18, 20 receive conventional pins 21 for joining together a number of different links, including links 10, to form the known inverted tooth chain 11.

The link 10 has a chain or link pitch $C_p$ conventionally defined as the distance between the centers of the first and second apertures 18, 20. It should be appreciated that a sprocket used in conjunction with the link 10 has a sprocket chordal pitch $S_p$ (conventionally defined as the distance separating adjacent teeth or tooth spaces) substantially equal to the chain pitch $C_p$. Thus, for conventional chains, $S_p = C_p$, or $S_p \cong C_p$.

As previously mentioned, a major source of chain drive noise is the sound generated as the chain engaging members, i.e. the toes 14, 16, leave the span and collide with the sprocket during meshing. The resultant impact noise is repeated with a frequency generally equal to that of the frequency of the chain meshing with the sprocket. It is contemplated herein that the overall noise levels associated with a chain drive system can be reduced by increasing the frequency at which the chain meshes with the sprocket to a level which is inaudible, or at least less audible, to the human ear.

Since frequency is inversely proportional to time, reducing the time period between impacts results in a corresponding increase in the frequency of the impact noise generated at a given rotational velocity of the drive chain. Thus, if the time period between impacts is reduced far enough, the frequency of the impact noise is correspondingly increased to the point that the frequency-dependent impact noise is less audible or not audible to the human ear.

The time period between impacts can be reduced by reducing the chain pitch $C_p$, and necessarily, the sprocket pitch $S_p$, for a given chain velocity (v). That is, with chain velocity (v) remaining constant, reducing the time period (t) between impacts requires a corresponding reduction in the chain pitch $C_p$, where $v = C_p/t$. However, reducing the chain pitch $C_p$ of the conventional link 10 to about 8.0 mm or less is problematic.

That is, as chain pitch $C_p$ is reduced, the size of the link 10 decreases, and a corresponding decrease in strength and load capacity of the chain results. More particularly, as the size of the link 10 decreases, there is less link material between the apertures 18, 20, and between each aperture 18, 20 and the corresponding edge of the link 10 thereby resulting in a structurally weaker link.

Figure 3:
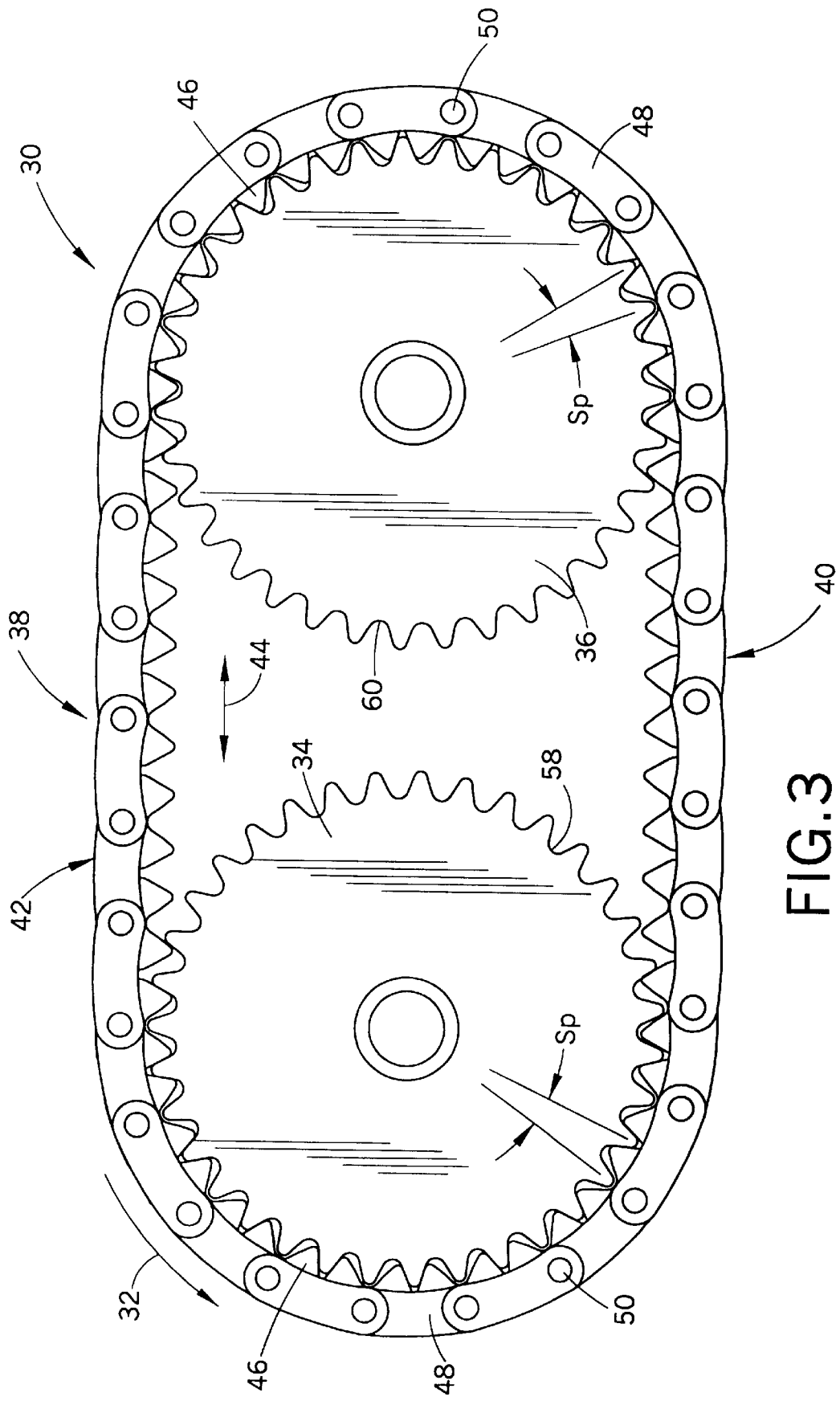
FIG. 3 illustrates a first embodiment of a chain system including a short pitch tooth chain, a drive sprocket, and a driven sprocket, that incorporates the features of the present invention therein.

Referring now to FIG. 3, there is shown a chain system 30, such as a drive chain system, timing chain system, etc. which incorporates the features of the present invention therein. The chain system 30 rotates in a counter-clockwise direction as shown by arrow 32. The chain system 30 includes at least a drive sprocket 34, a driven sprocket 36, and a short pitch tooth chain 38. The short pitch tooth chain 38 engages and wraps about sprockets 34 and 36 and has two spans extending between the sprockets, slack strand 40 and taut strand 42. The taut strand 42 is under tension as shown by arrows 44.

Figure 4:
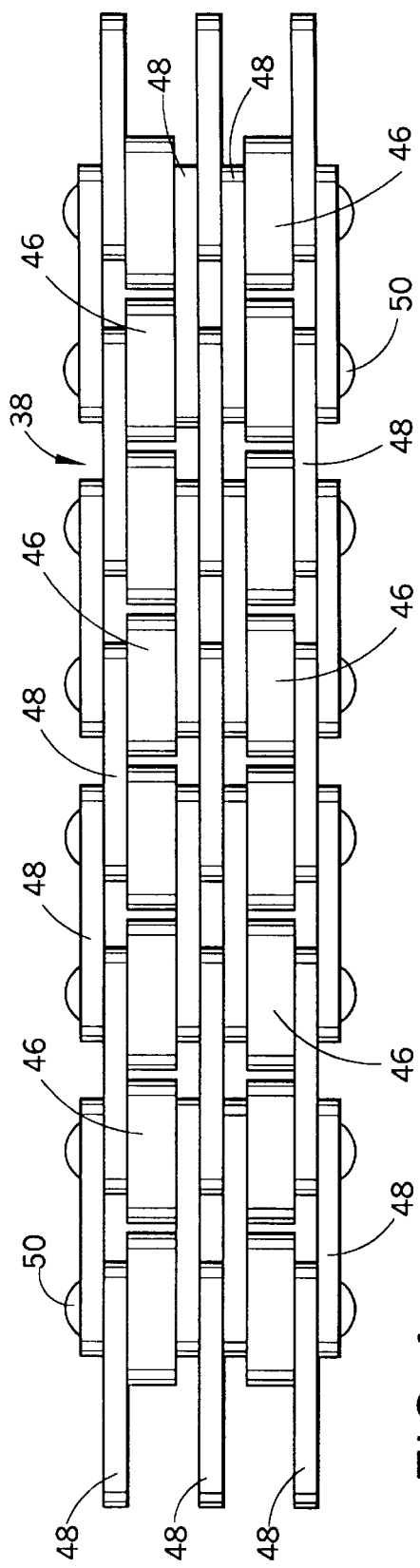
FIG. 4 is a top fragmentary view of an exemplary lacing pattern for the short pitch tooth chain of FIG. 3.
Figure 5:
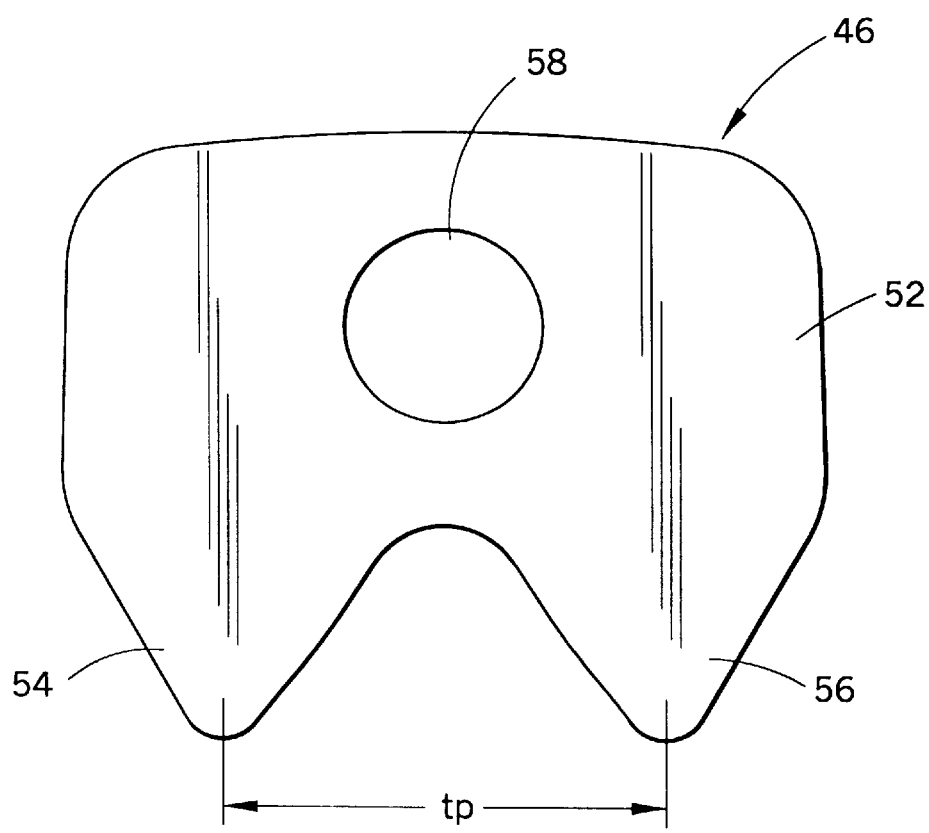
FIG. 5 illustrates a double-toed link of the short pitch tooth chain of FIG. 3.
Figure 6:
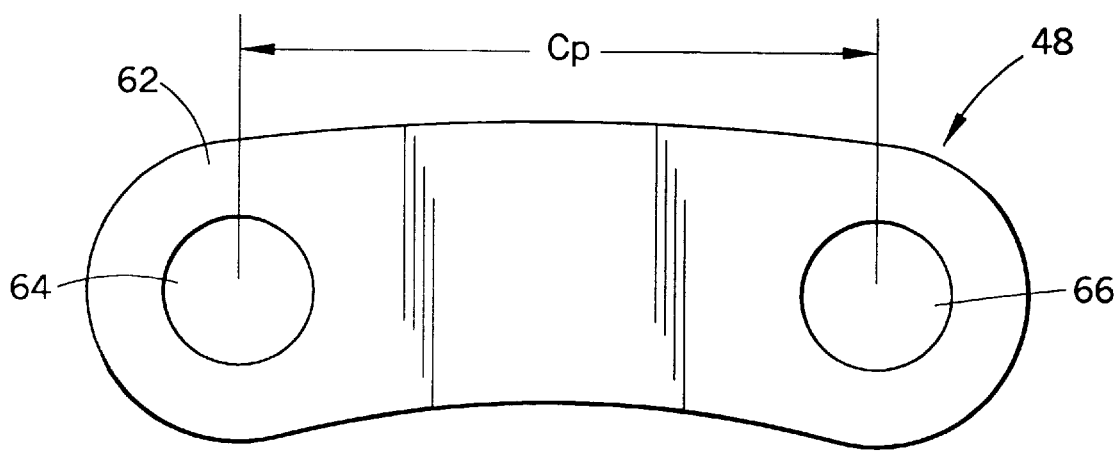
FIG. 6 illustrates a tension link of the short pitch tooth chain of FIG. 3.

With continuing reference to FIG. 3, and particular reference to FIGS. 4–6, the short pitch tooth chain 38 includes a number of double-toed links 46, tension links 48, and pins 50 interconnecting the links 46, 48. The links 46, 48 are each pivotal about the pins 50 so that as the links enter the sprocket wrap, each link may articulate independently about the respective pin to conform with the curvature of the sprocket.

It should be appreciated that the links 46, 48 and pins 50 may be interconnected in various lacing patterns known in the art to produce short pitch tooth chains having different strength and load capacity characteristics. An exemplary lacing pattern is shown in FIG. 4. Further, the dimensions (e.g. length, width, height, etc.) and material considerations (powdered metal, stamped metal, steel, etc.) of the links 46, 48 and the pins 50 can be varied to produce chains having different strength and load capacity characteristics in a known manner.

The double-toed link 46 (FIG. 5) includes a body portion 52 having a first toe 54 spaced from a second toe 56 by a distance $T_p$ (toe pitch). A central aperture 58 extends through the body portion 52. The toes 54, 56 engage mutually conforming tooth spaces 59, 60 (FIG. 3) of the sprockets 34, 36, respectively. The sprockets 34, 36 each have sprocket chordal pitch $S_p$ which is substantially equal to the toe pitch $T_p$. It should be appreciated that by providing a link 46 with a single aperture therethrough, more link material extends between the aperture and each side edge thereof, relative to the link 10.

The tension link 48 (FIG. 6) primarily carries the load on the chain 38. Each tension link 48 includes an arcuate-shaped body portion 62 having a first aperture 64 proximate one end thereof, and a second aperture 66 proximate the other end. As best seen in FIG. 4, each tension link 48 carries two double-toed links 46 via two pins 50 each extending through a respective aperture 64, 66. The chain pitch $C_p$ for the chain 38 is defined as the distance between the centers of the apertures 64, 66. For the chain 38, $C_p=2S_p=2T_p$, or $C_p \cong 2S_p \cong 2T_p$. It has been determined that, in automotive applications, the frequency-dependent impact noise is reduced when the chain pitch $C_p$ of the chain 38 is about 8.0 mm (0.315 inches) or less.

Thus, by reducing the toe pitch $T_p$ and the sprocket pitch $S_p$ to a value approximately one-half of the chain pitch $C_p$, the frequency of impacts between the toes 54, 56 and the tooth spaces 58, 60 is increased, while maintaining high strength and high load capacity characteristics of the chain 38. That is, the tension links 48 have substantially the same chain pitch $C_p$ as the prior art links 10.

Accordingly, the chain 38 maintains substantially the same high-strength and load capacity characteristics as a known inverted tooth chain incorporating the links 10. However, the chain 38 also permits the sprocket chordal pitch $S_p$ to be reduced to substantially one-half of the chain pitch. As a result, for a given operating velocity of the chain, the overall noise levels associated with the chain 38 are reduced by increasing the frequency at which the chain meshes with the sprockets to a level which is inaudible, or at least less audible to the human ear.

However, since the links 46 are freely pivotal about the pins 50, depending upon the particular dynamics of the chain 38, adjacent links 46 may inadvertently rotate into contact with each other when in the spans 40, 42, thus generating undesirable noise. The chain embodiments described hereafter, prevent this undesirable noise from occurring.

Figure 7:
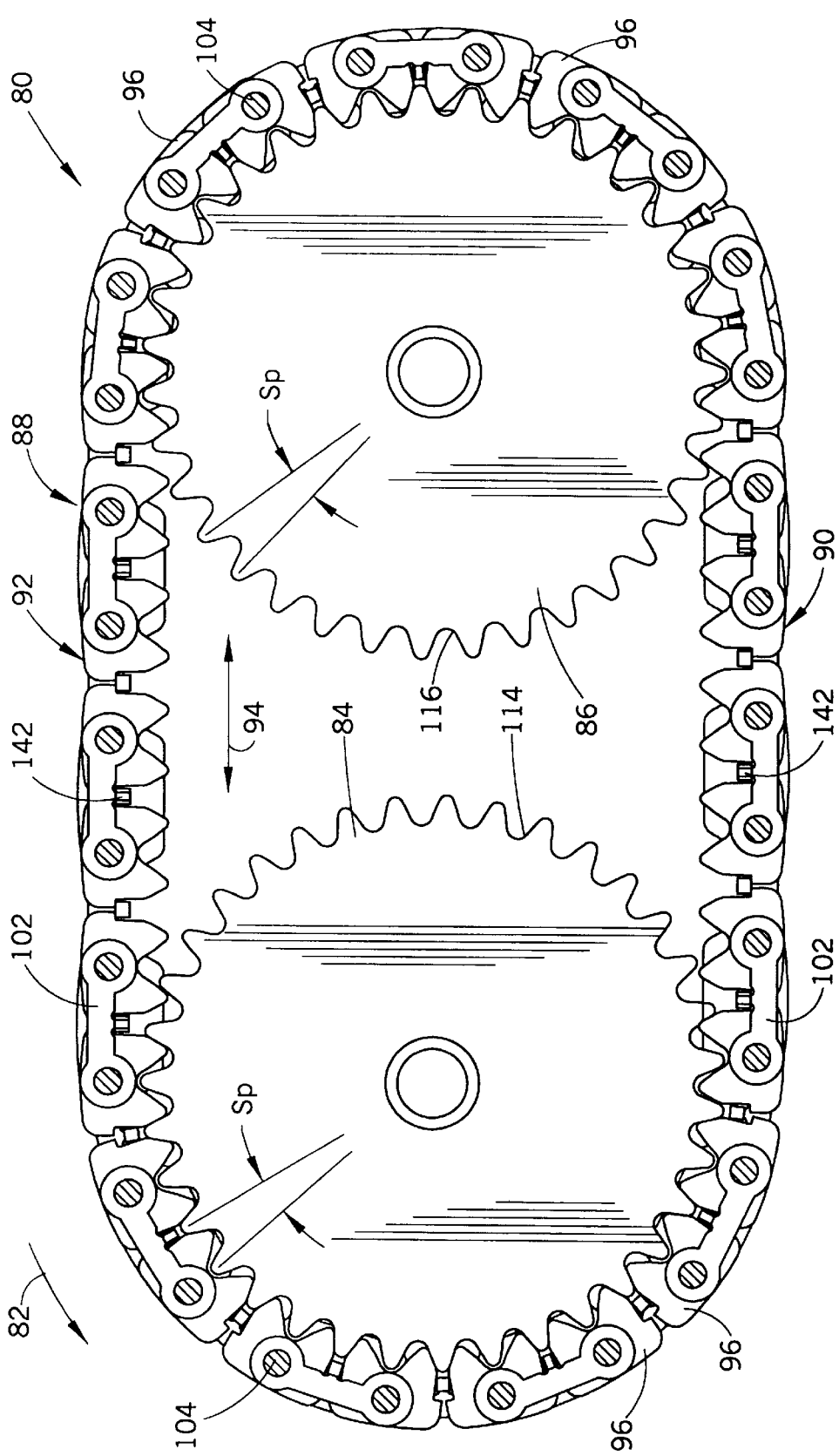
FIG. 7 illustrates a second embodiment of chain system including a short pitch tooth chain, a drive sprocket, and a driven sprocket, that incorporates the features of the present invention therein.
Figure 9:
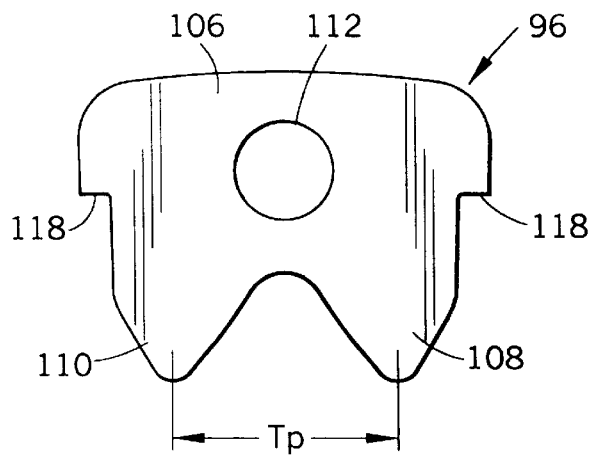
FIG. 9 illustrates a double-toed link of the short pitch tooth chain of FIG. 7.
Figure 10:
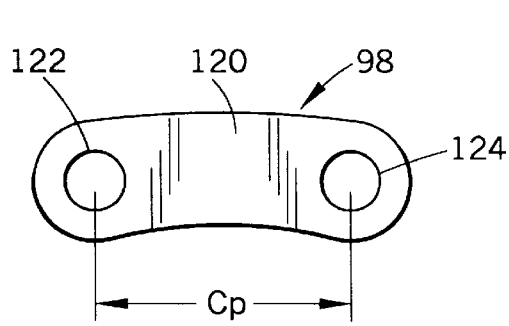
FIG. 10 illustrates a tension link of the short pitch tooth chain of FIG. 7.
Figure 11:
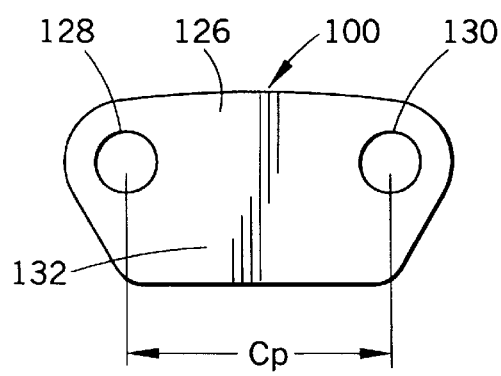
FIG. 11 illustrates a guide link of the short pitch tooth chain of FIG. 7.

Referring now to FIG. 7, a timing, drive, etc. chain system 80 incorporates the features of the present invention therein. The chain system 80 rotates in a counter-clockwise direction as shown by arrow 82, and includes a drive sprocket 84, a driven sprocket 86, and a short pitch tooth chain 88. The short pitch tooth chain 88 engages and wraps about sprockets 84 and 86 and has two spans extending between the sprockets, slack strand 90 and taut strand 92. The taut strand 92 is under tension as shown by arrows 94.

With continuing reference to FIG. 7, and particular reference to FIGS. 8–13, the short pitch tooth chain 88 includes a number of double-toed links 96, tension links 98, guide links 100, spring links 102, and pins 104. The double-toed links 96, tension links 98, and spring links 102 are each pivotal about the pins 104. The double-toed links 96, tension links 98, guide links 100, and spring links 102 may be interconnected in various lacing patterns to produce chains having different strength and load capacity characteristics.

Figure 8:
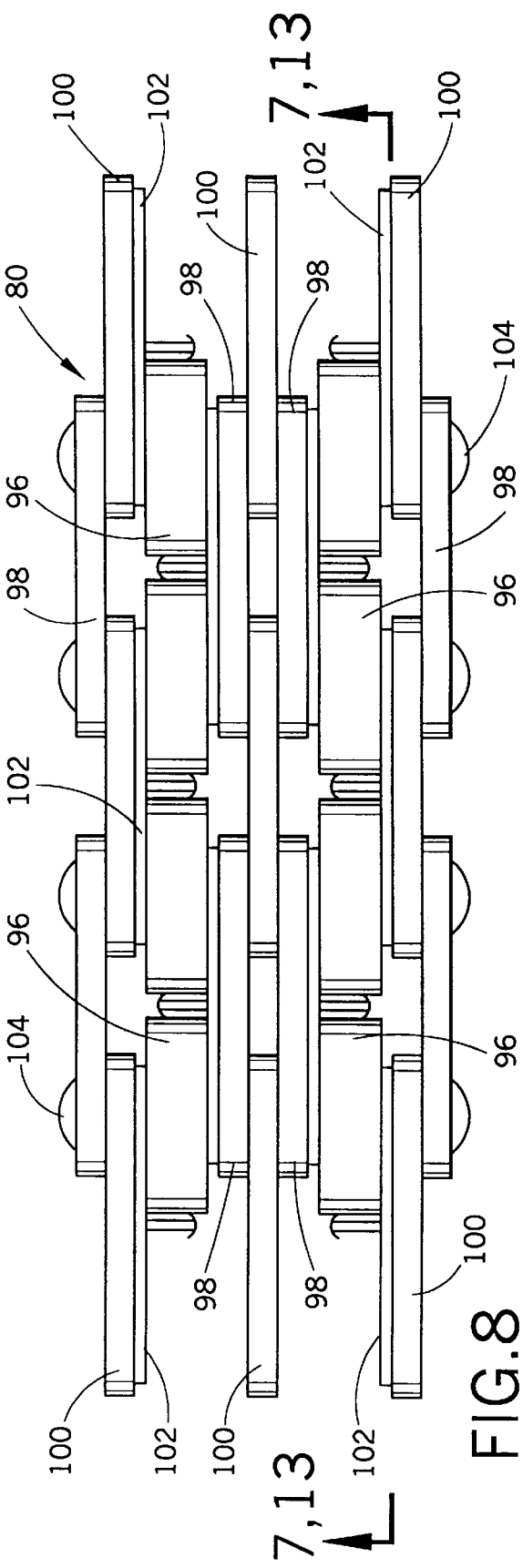
FIG. 8 is a top fragmentary view of an exemplary lacing pattern for the short pitch tooth chain of FIG. 7.

An exemplary lacing pattern is shown in FIG. 8. For instance, it is known that the tension links 98 and guide links 100 can be interchanged. Further, the dimensions (e.g. length, width, height, etc.) and material considerations of the various links and pins can be varied to produce chains having different strength and load capacity characteristics in a known manner.

The double-toed link 96 (FIG. 9) includes a body portion 106 having a first toe 108 spaced from a second toe 110 by a distance $T_p$ (toe pitch). A central aperture 112 extends through the body portion 106. The toes 108, 110 engage mutually conforming tooth spaces 114, 116 (FIG. 7) of the sprockets 84, 86, respectively. The sprockets 84, 86 each have a sprocket chordal pitch $S_p$ which is substantially equal to the toe pitch $T_p$. The link 96 also includes a ledge or shoulder portion 118 on each side thereof.

The tension links 98 (FIG. 10) primarily carry the load on the chain 88. Each tension link 98 includes a body portion 120 having a first aperture 122 proximate one end thereof and a second aperture 124 proximate the other end. As best seen in FIG. 8, each tension link 98 carries two double-toed links 96 via two pins 104 each extending through a respective aperture 122, 124. The chain pitch $C_p$ for the chain 88 is defined as the distance between the centers of the apertures 122, 124. For the chain 88, $C_p=2S_p=2T_p$, or $C_p \cong 2S_p \cong 2T_p$.

The guide links 100 (FIG. 11) primarily constrain lateral movement of the chain 88 relative to the sprockets 84, 86. In the embodiment being described, the guide links 100 are not pivotal relative to the pins 104. Each guide link 100 includes a body portion 126 having a first aperture 128 proximate one end thereof and a second aperture 130 proximate the other end. As with the tension links 98, the centers of the apertures 128, 130 are separated by the distance $C_p$. The guide links 100 also include an extended lower portion 132 which is constrained within a groove (not shown) on an external peripheral surface of the sprockets 84, 86 when the link 100 enters the respective sprocket wraps. The guide links 100 can also carry the chain load.

Figure 12:
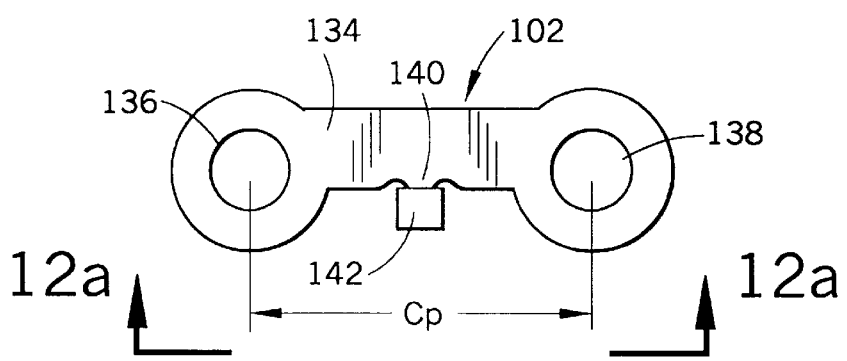
FIG. 12 illustrates a spring link of the short pitch tooth chain of FIG. 7.
Figure 12A:
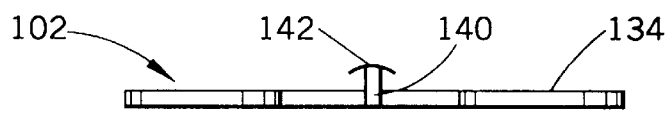
FIG. 12a is a side view of the spring link taken along the line 12a—12a of FIG. 12.

The spring links 102 (FIGS. 12 and 12*a*) provide means for preventing adjacent double-toed links 96 from contacting each other in the slack strand 90 or taut strand 92. In particular, each spring link 102 includes a body portion 134 having a first aperture 136 proximate one end thereof and a second aperture 138 proximate the other end. As with the other links 98, 100, the centers of the apertures 136, 138 are separated by the distance $C_p$. The spring links 102 also include a cantilevered arm portion 140 extending transversely from a central portion of the body 134. A blade spring 142 or other biasing means is secured to a free end of the arm 140.

Figure 13:
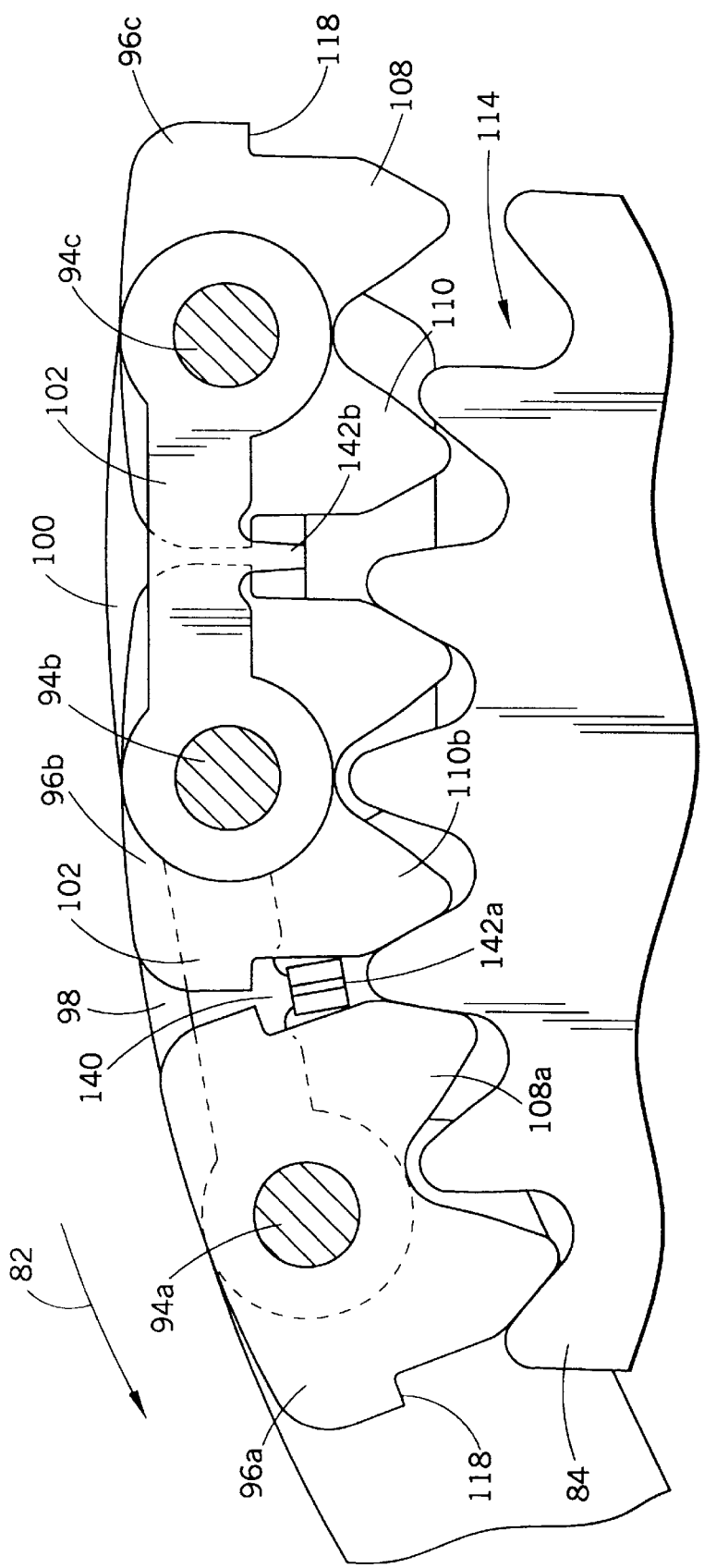
FIG. 13 is an enlarged view of the drive sprocket of FIG. 7 with two double-toed links seated in a tooth space and a third double-toed link being collected from a taut span of the short pitch tooth chain.

As shown in FIG. 13, the blade springs 142 are interposed between adjacent double-toed links 96 such that the blade springs 142 are in tension by continuously contacting mutually opposing side walls of adjacent links 96. As previously mentioned, the double-toed links 96 are freely articulatable about the respective pins 94. Accordingly, the blade springs 142 urge the adjacent links 96 apart to prevent the links 96 from impacting, and thus generating undesirable noise.

In particular, as shown in FIG. 13, as the links 96a, 96b enter the wrap of the sprocket 84, the toe 108a of link 96a and the toe 110b of link 96b consecutively pivot around their respective pins 94a, 94b toward each other. As a result, the blade spring 142a is increasingly compressed in tension relative to the blade spring 142b interposed between links 96b, 96c. As the sprocket 84 rotates in the direction of arrow 82, the links 96b, 96c will fully engage the sprocket 84 in the wrap resulting in a full compression of the blade spring 142b.

It should be appreciated that as the sprocket 84 continues further in the direction of arrow 82, the links 96 exit the wrap into the slack strand 90 (FIG. 7). As a result, the links 96 are again free to rotate about the respective pins 94. Thus, the blade springs 142 between adjacent links 96 progressively flex outwardly under a spring force to urge adjacent links 96 apart and prevent the links 96 from undesirably contacting while in the strands 90, 92.

Thus, by reducing the toe pitch $T_p$ and the sprocket pitch $S_p$ to a value approximately one-half of the chain pitch $C_p$, the frequency of impacts between the toes 108, 110 and the tooth spaces 114, 116 is increased, while maintaining high strength and load capacity characteristics of the conventional chain 11. That is, the tension links 98 and guide links 100 have substantially the same chain pitch $C_p$ as the prior art links 10.

Accordingly, the chain 88 maintains substantially the same high-strength and load capacity characteristics as a known inverted tooth chain incorporating the links 10. However, the chain 88 also permits the sprocket chordal pitch $S_p$ to be reduced to substantially one-half of the chain pitch. As a result, for a given operating velocity of the chain, the overall noise levels associated with the chain 88 are reduced by increasing the frequency at which the chain meshes with the sprockets to a level which is inaudible, or at least less audible to the human ear.

Figure 14:
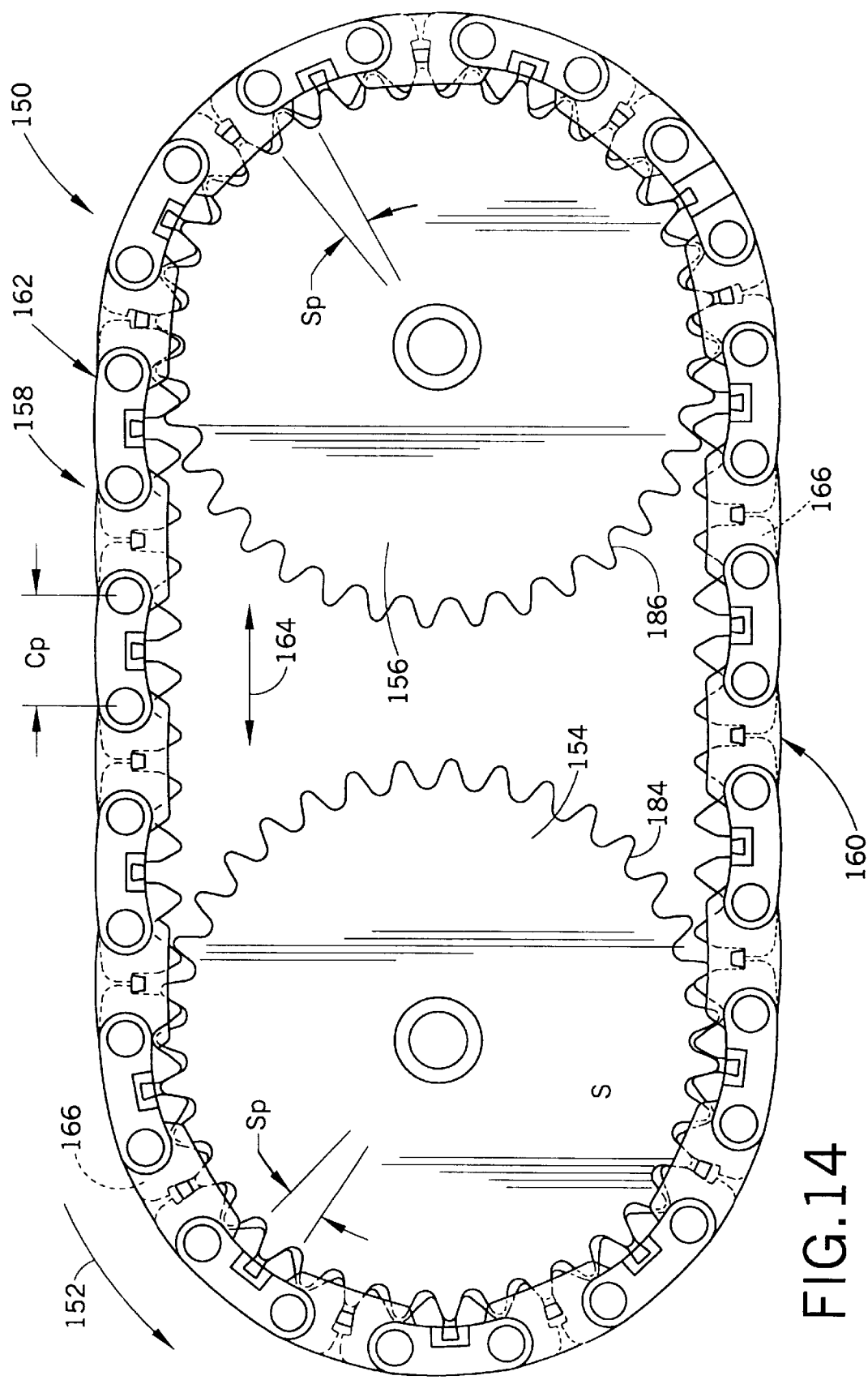
FIG. 14 illustrates a third embodiment of a chain system including a short pitch tooth chain, a drive sprocket, and a driven sprocket, that incorporates the features of the present invention therein.

Referring now to FIG. 14, a timing, drive, etc. chain system 150 incorporates the features of the present invention therein. The chain system 150 rotates in a counter-clockwise direction as shown by arrow 152, and includes a drive sprocket 154, a driven sprocket 156, and a short pitch tooth chain 158. The short pitch tooth chain 158 engages and wraps about sprockets 154 and 156 and has two spans extending between the sprockets, slack strand 160 and taut strand 162. The taut strand 162 is under tension as shown by arrows 164.

With continuing reference to FIG. 14, and particular reference to FIGS. 15–22, the short pitch tooth chain 158 includes a number of double-toed links 166, tension links 168, guide links 170, and pins 172. The double-toed links 166 and tension links 168 are each pivotal about the pins 172. In the embodiment being described, the guide links 170 are not pivotal relative to the pins 172.

Figure 15:
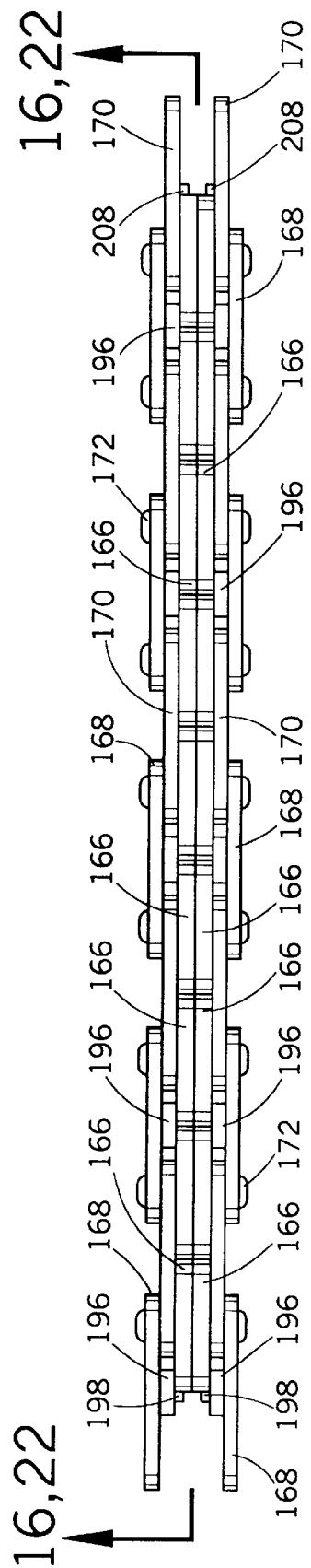
FIG. 15 is a top fragmentary view of a first exemplary lacing pattern for the short pitch tooth chain of FIG. 14.
Figure 16:
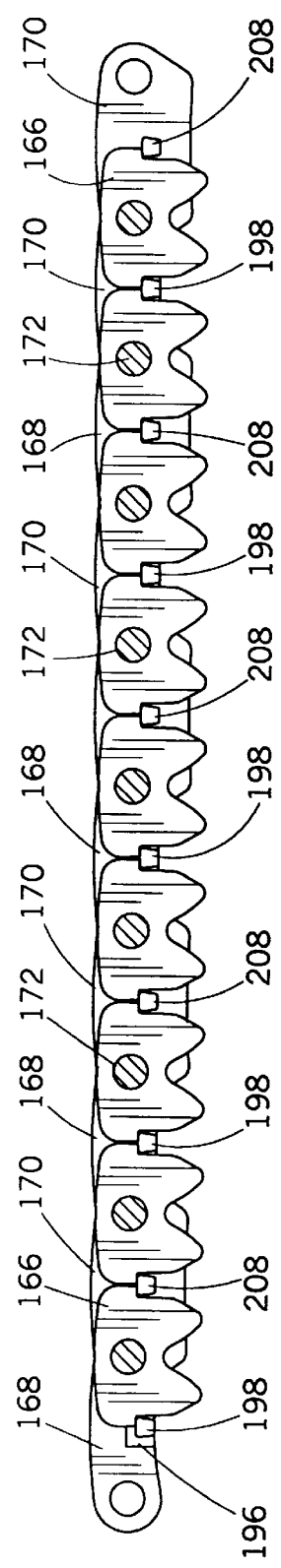
FIG. 16 is a side view of the lacing pattern taken along the line 16—16 of FIG. 15.
Figure 17:
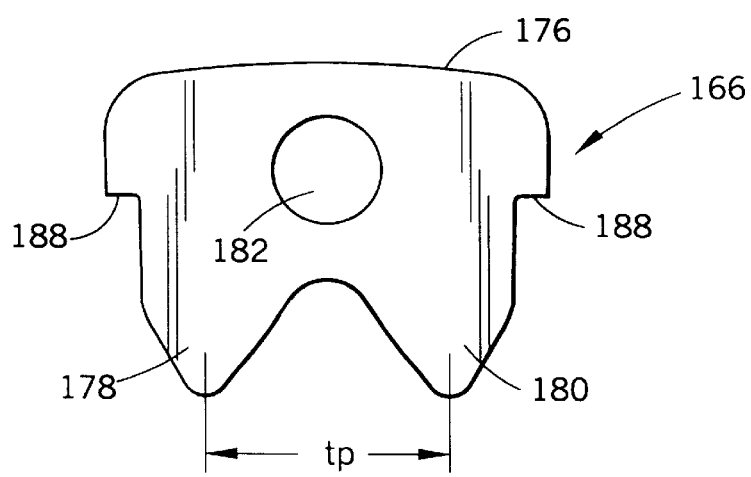
FIG. 17 illustrates a double-toed link of the short pitch tooth chain of FIG. 14.
Figure 18:
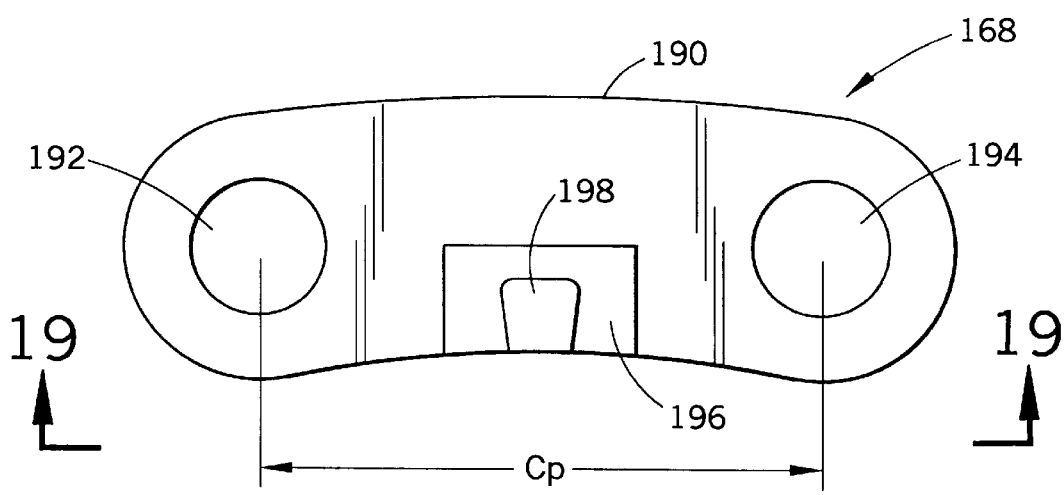
FIG. 18 illustrates a first tension link of the short pitch tooth chain of FIG. 14.
Figure 19:
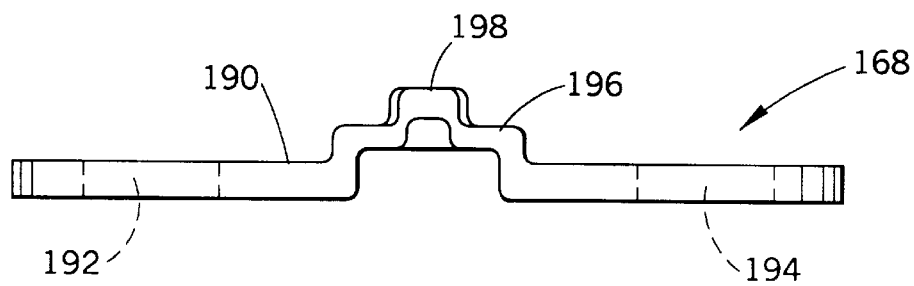
FIG. 19 illustrates a side view of the tension link taken along the line 19—19 of FIG. 18.
Figure 20:
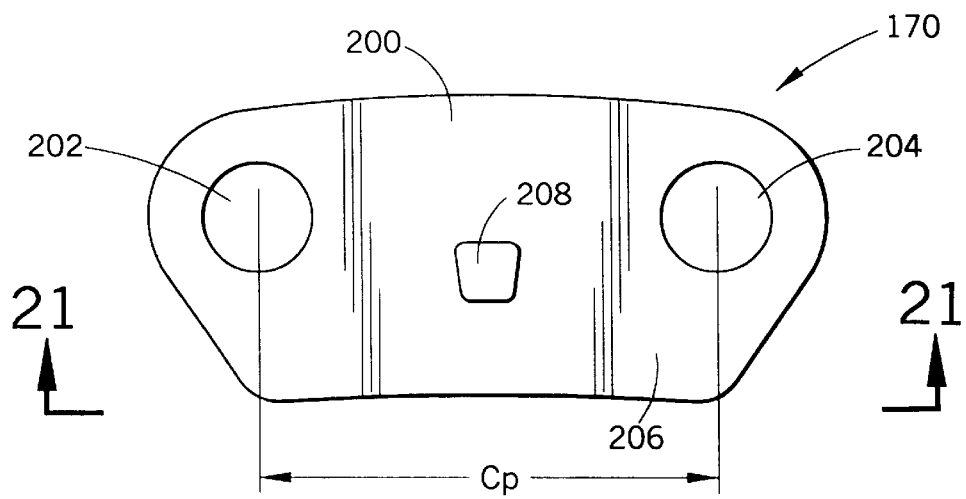
FIG. 20 illustrates a guide link of the short pitch tooth chain of FIG. 14.
Figure 21:
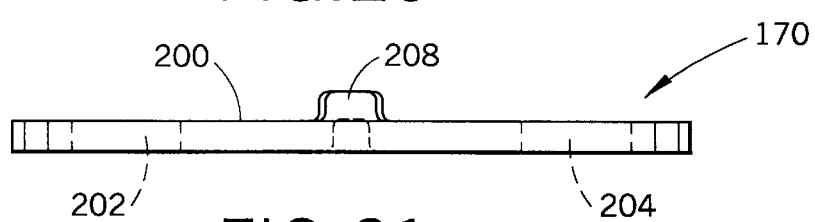
FIG. 21 illustrates a side view of the guide link taken along the line 21—21 of FIG. 20.

The double-toed links 166, tension links 168, and guide links 170 may be interconnected in various lacing patterns to produce chains having different strength and load capacity characteristics. An exemplary lacing pattern is shown in FIGS. 15 and 16. The dimensions (e.g. length, width, height, etc.) and material considerations of the various links and pins can be varied to produce chains having different strength and load capacity characteristics in a known manner.

The double-toed link 166 (FIG. 17) includes a body portion 176 having a first toe 178 spaced from a second toe 180 by a distance $T_p$ (toe pitch). A central aperture 182 extends through the body portion 176. The toes 178, 180 engage mutually conforming tooth spaces 184, 186 (FIG. 14) of the sprockets 154, 156, respectively. The sprockets 154, 156 each have a sprocket chordal pitch $S_p$ which is substantially equal to the toe pitch $T_p$. The link 166 also includes a ledge or shoulder portion 188 on each side thereof.

The tension links 168 (FIGS. 18 and 19) primarily carry the load on the chain 158. Each tension link 168 includes a body portion 190 having a first aperture 192 proximate one end thereof and a second aperture 194 proximate the other end. As best seen in FIG. 15, each tension link 168 carries two double-toed links 166 via two pins 172 each extending through a respective aperture 192, 194 and link 166. The chain pitch $C_p$ for the chain 158 is defined as the distance between the centers of the apertures 192, 194. For the chain 158, $C_p=2S_p=2T_p$, or $C_p \cong 2S_p \cong 2T_p$.

The tension link 168 further includes a raised pad 196 for supporting a wedge portion 198. In the embodiment being described, the wedge portion 198 forms a trapezoid in a plan view. As best seen in FIG. 15, the pad portion 196 extends between two adjacent guide links 170, and the wedge portion 198 extends between two adjacent double-toed links 166. The thickness 196a of the raised pad 196 is substantially equal to the thickness of the guide links 170 to permit the wedge portion 198 to extend at least partially between adjacent double-toed links 166.

The guide links 170 (FIGS. 20 and 21) primarily constrain lateral movement of the chain 158 relative to the sprockets 154, 156. Each guide link 170 includes a body portion 200 having a first aperture 202 proximate one end thereof and a second aperture 204 proximate the other end. As with the tension links 168, the centers of the apertures 202, 204 are separated by the distance $C_p$. The guide links 170 also include an extended lower portion 206 which is constrained within a groove (not shown) on an external peripheral surface of the sprockets 154, 156 when the link 170 enters the respective sprocket wraps. The guide links 170 can also carry a portion of the loading on the chain 158.

The guide link 170 further includes a raised wedge portion 208. In the embodiment being described, the wedge portion 208 forms a trapezoid in a plan view. As best seen in FIG. 15, the wedge portion 208 extends at least partially between two adjacent double-toed links 166.

Figure 22:
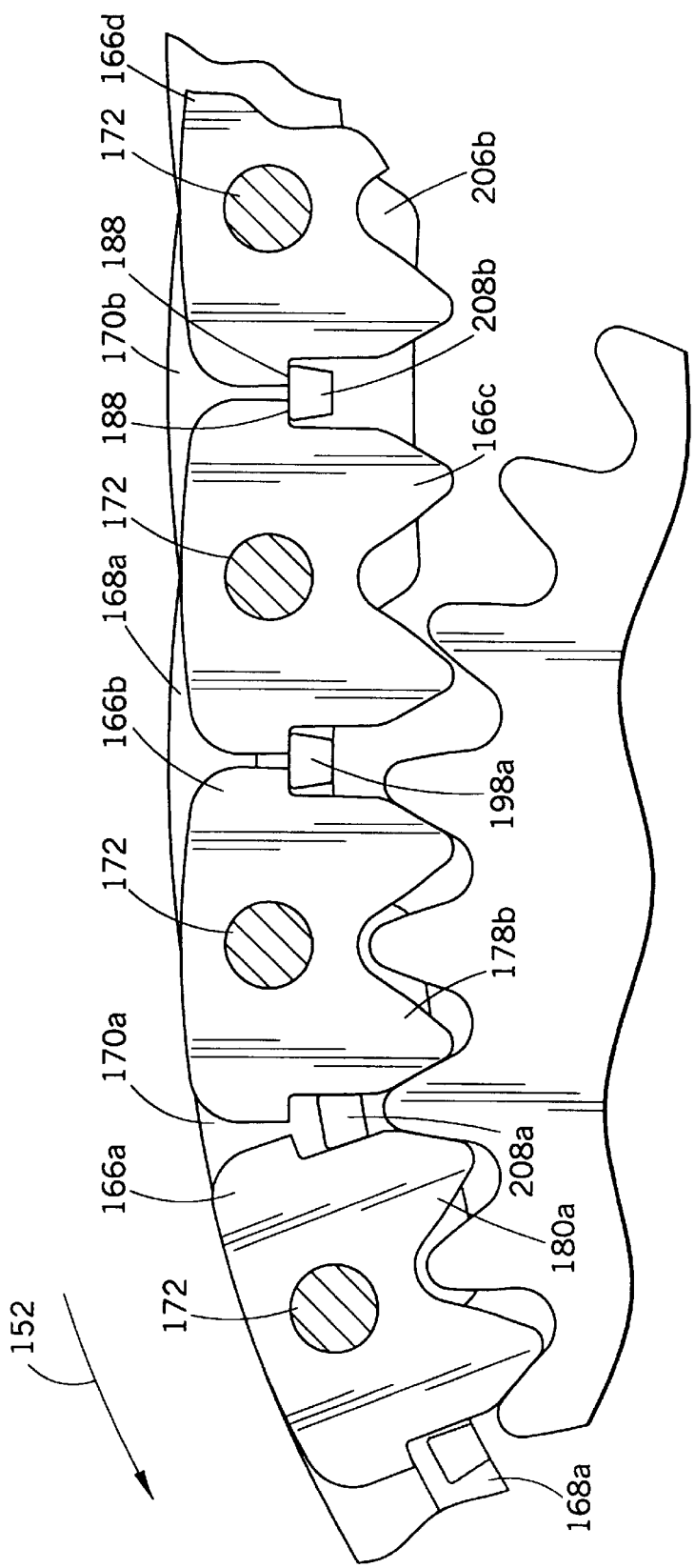
FIG. 22 is an enlarged view of the drive sprocket of FIG. 14 with two double-toed links seated in a tooth space and a third double-toed link being collected from a taut span of the short pitch tooth chain.

The wedge portions 198, 208 provide means for preventing adjacent double-toed links 96 from inadvertently contacting each other in the slack strand 160 or taut strand 162. In particular, as best seen in FIG. 22, the raised wedge portion 208b of guide link 170b extends between adjacent double-toed links 166c, 166d. The mutually opposing shoulder portions 188 of the links 166c, 166d abut the wedge portion 208b and thus prevent the adjacent double-toed links from articulating about the pins 172 while in the strands 160, 162. Likewise, the wedge portion 198a of the tension link 168a extends between adjacent double-toed links 166b, 166c. The mutually opposing shoulder portions 188 of the links 166b, 166c abut the raised wedge portion 198a and thus prevent the double-toed links from articulating about the pins 172 while in the strands 160, 162.

The trapezoidal shape of the raised wedge portions 198, 208 permit adjacent double-toed links 166 to pivot toward each other in the sprocket wrap. With reference again to FIG. 22, the side walls of the wedge portion 208a converge in a radially inward direction (relative to the sprocket center) to permit the toes 180a, 178b to consecutively pivot toward each other as the links enter the sprocket wrap. As the sprocket 154 continues to rotate in the direction of arrow 152, the links 166 will exit the wrap back into the slack strand 160. As a result, the links 166 will rotate about the respective pins 172 until the shoulder portions 188 abut the wedge portions 198, 208 to prevent the links 166 from impacting, and thus generating undesirable noise.

Thus, by reducing the toe pitch $T_p$ and the sprocket pitch $S_p$ to a value of approximately one-half the chain pitch $C_p$, the frequency of impacts between the toes 178, 180 and the tooth spaces 184, 186 is increased, while maintaining high strength and load capacity characteristics of the conventional chain 11. That is, the tension links 168 and guide links 170 have substantially the same chain pitch $C_p$ as the prior art links 10. As a result, for a given operating velocity of the chain, the overall noise levels associated with the chain 158 are reduced by increasing the frequency at which the chain meshes with the sprockets to a level which is inaudible, or at least less audible to the human ear.

Figure 23:
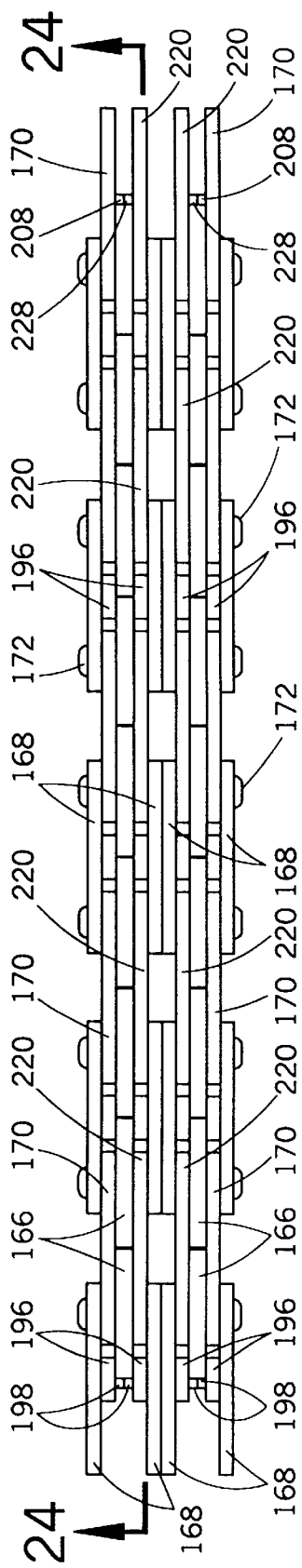
FIG. 23 is a top fragmentary view of a second exemplary lacing pattern for the short pitch tooth chain of FIG. 14.

As mentioned, the double-toed links 166, tension links 168, and guide links 170 may be interconnected in various lacing patterns to produce chains having different strength and load capacity characteristics. FIGS. 22 and 23 illustrate an exemplary lacing pattern having greater strength and load capacity characteristics than the lacing pattern of FIGS. 15 and 16. To implement the lacing pattern of FIGS. 22 and 23, two different tension link configurations must be utilized.

Figure 25:
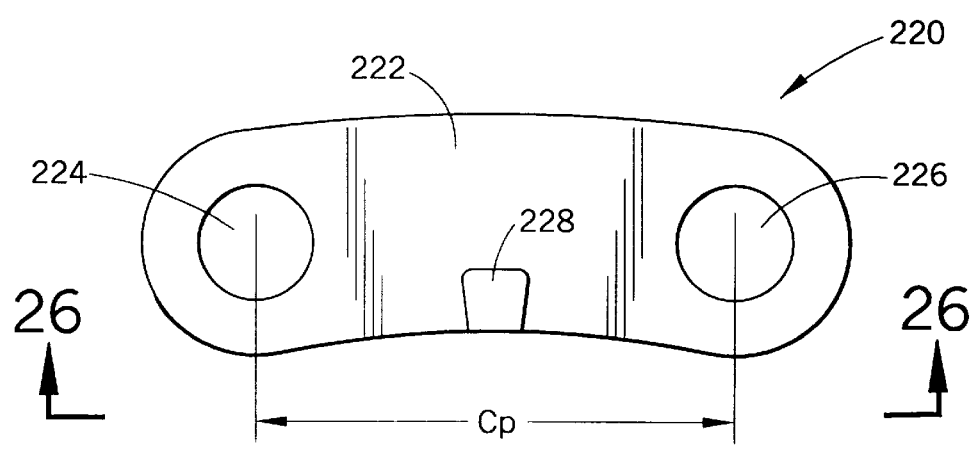
FIG. 25 illustrates a second tension link of the short pitch tooth chain of FIG. 14.
Figure 26:
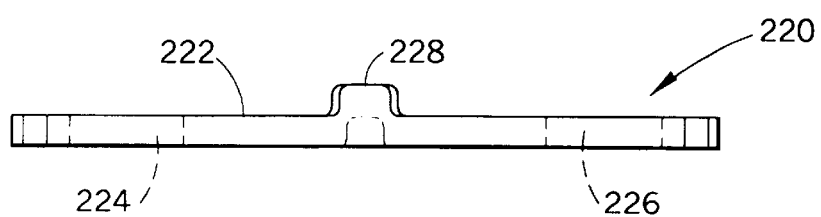
FIG. 26 illustrates a side view of the second tension link taken along the line 26—26 of FIG. 25.

Referring now to FIGS. 25 and 26, a second tension link 220 includes a body portion 222 having a first aperture 224 proximate one end thereof and a second aperture 226 proximate the other end. As best seen in FIG. 23, each tension link 220 carries two double-toed links 166 via two pins 172 each extending through a respective aperture 224, 226. The chain pitch $C_p$ for the chain 158 is defined as the distance between the centers of the apertures 224, 226. For the chain 158, $C_p = 2S_p = 2T_p$, or $C_p \cong 2S_p \cong 2T_p$.

Figure 24:
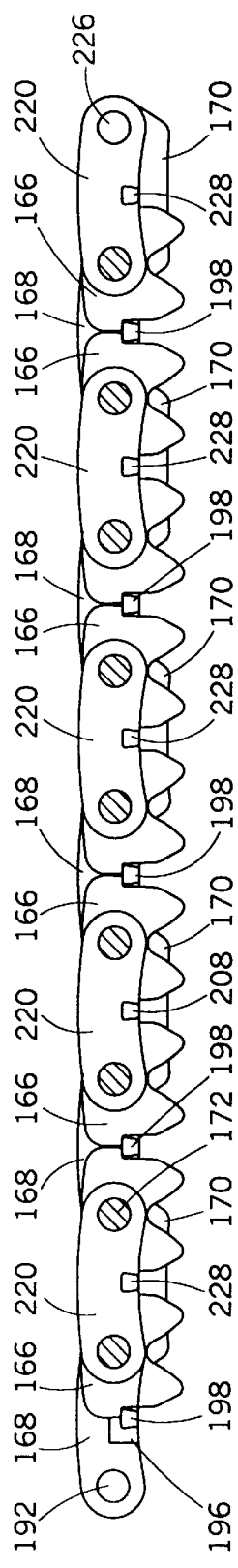
FIG. 24 is a side view of the lacing pattern taken along the line 24—24 of FIG. 23.

The second tension link 220 further includes a raised wedge portion 228 that forms a trapezoid in a plan view. As best seen in FIG. 24, the wedge portion 228 extends at least partially between two adjacent double-toed links 166 to prevent the double-toed links from articulating about the pins 172 while in the spans 160, 162 in the same manner as the first tension links 168 and guide links 170. In the embodiment being described, the raised wedge portion 208 of the guide links 170 cooperate with the raised wedge portions 228 of the second tension links 220 to prevent adjacent double-toed links 166 from contacting each other.

The wedge portions 198, 208, 228 of the tension links 168, 220, and guide links 170 (and the pads 196 of the links 168) can be formed by molding, stamping, pressing, cutting, etc. the links in any known manner.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment(s), the invention is now claimed to be:

1. A tooth chain, comprising:
   a first link having a first aperture spaced from a second aperture by a first distance;
   a second link having a first toe spaced from a second toe by a second distance, the second link having a third aperture and being connected to the first link by a first pin extending through the first and third apertures;
   a third link having a third toe spaced from a fourth toe by the second distance, the third link having a fourth aperture and being connected to the first link by a second pin extending through the second and fourth apertures; and
   the first distance defining a chain pitch and the second distance defining a sprocket chordal pitch wherein the chain pitch is about twice the sprocket chordal pitch.

2. The chain of claim 1, further including means for preventing the second and third links from contacting each other.

3. The chain of claim 1, further including means associated with the first link for preventing the second and third links from contacting each other.

4. The chain of claim 1, wherein the first link includes a raised wedge portion extending between the second and third links.

5. The chain of claim 1, further including a guide link having a fifth aperture spaced from a sixth aperture by the first distance and the first pin extending through the fifth aperture.

6. The chain of claim 1, wherein the first link is adapted for carrying a chain load, and the first, second, third, and fourth toes are adapted for engaging mutually conforming tooth spaces associated with a sprocket.

7. The chain system of claim 1, wherein the third aperture is sized to accommodate only the first pin and the fourth aperture is sized to accomodate only the second pin.

8. The chain of claim 5, wherein the guide link includes a raised wedge portion extending between the second and third links.

9. The chain of claim 5, further including:
   means associated with the first link for preventing the second and third links from contacting each other; and
   means associated with the guide link for preventing the third link from contacting a fourth link adjacent to the third link.

10. A chain system, comprising:
    a first sprocket having a first plurality of sprocket teeth spaced apart by a first distance;
    a second sprocket having a second plurality of sprocket teeth spaced apart by the first distance;
    a chain wrapped around the first and second sprockets, the chain including:
      a first link having a first aperture spaced from a second aperture by a second distance;
      a second link having a first toe spaced from a second toe by the first distance, the second link having a third aperture and being connected to the first link by a first pin extending through the first and third apertures;
      a third link having a third toe spaced from a fourth toe by the first distance, the third link having a fourth aperture and being connected to the first link by a second pin extending through the second and fourth apertures; and
      the first distance defining a sprocket chordal pitch and the second distance defining a chain pitch wherein the chain pitch is about twice the sprocket chordal pitch.

11. The chain system of claim 10, further including means associated with the chain for preventing the second and third links from contacting each other.

12. The chain system of claim 10, further including means associated with the first link for preventing the second and third links from contacting each other.

13. The chain system of claim 10, wherein the first link includes a raised wedge portion extending between the second and third links.

14. The chain system of claim 10, further including a guide link having a fifth aperture spaced from a sixth aperture by the first distance and the first pin extending through the fifth aperture.

15. The chain system of claim 10, wherein the first link is adapted for carrying a chain load, and the first, second, third, and fourth toes are adapted for engaging mutually conforming tooth spaces associated with a sprocket.

16. The chain system of claim 10, wherein the third aperture is sized to accommodate only the first pin and the fourth aperture is sized to accomodate only the second pin.

17. The chain system of claim 14, wherein the guide link includes a raised wedge portion extending between the second and third links.

18. The chain system of claim 14, further including:
   means associated with the first link for preventing the second and third links from contacting each other; and
   means associated with the guide link for preventing the third link from contacting a fourth link adjacent to the third link.

19. A chain comprising:
   a first link member having a first aperture spaced from a second aperture by a first distance;
   a second link member connected to the first link member and having a first toe spaced from a second toe by a second distance, the toes being adapted for engagement with tooth spaces associated with a sprocket, the tooth spaces being spaced apart by a third distance; and
   the second distance being substantially equal to the third distance, and the second distance being about one half of the first distance.

20. A chain system comprising:
   a first sprocket having a first plurality of tooth spaces spaced apart by a first distance;
   a second sprocket having a second plurality of tooth spaces spaced apart by the first distance; and
   a chain including a first link member having a first aperture spaced from a second aperture by a second distance, a second link member connected to the first link member and having a first toe spaced from a second toe by a third distance, the toes being adapted for engagement with the first and second plurality of tooth spaces, and the first distance being substantially equal to the third distance, and the third distance being about one half of the second distance.

* * * * *